(12) United States Patent
Kim et al.

(10) Patent No.: US 11,643,853 B2
(45) Date of Patent: May 9, 2023

(54) VEHICLE AND CONTROLLING METHOD THEREOF

(71) Applicants: Hyundai Motor Company, Seoul (KR); Kia Motors Corporation, Seoul (KR)

(72) Inventors: Hyunsang Kim, Whasung-Si (KR); YunSup Ann, Whasung-Si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 162 days.

(21) Appl. No.: 17/210,286

(22) Filed: Mar. 23, 2021

(65) Prior Publication Data

US 2022/0074242 A1  Mar. 10, 2022

(30) Foreign Application Priority Data

Sep. 7, 2020 (KR) .......................... 10-2020-0113675

(51) Int. Cl.
*E05B 81/78* (2014.01)
*E05B 83/36* (2014.01)

(52) U.S. Cl.
CPC .............. *E05B 81/78* (2013.01); *E05B 83/36* (2013.01); *E05Y 2400/858* (2013.01); *E05Y 2800/426* (2013.01); *E05Y 2900/531* (2013.01)

(58) Field of Classification Search
CPC . G07C 9/00309; G07C 9/00563; E05B 81/78; E05B 83/36; B60R 25/25; B60R 25/305
See application file for complete search history.

(56) References Cited

U.S. PATENT DOCUMENTS

| 11,180,113 | B1* | 11/2021 | Wale ..................... B60R 25/102 |
| 2019/0016281 | A1* | 1/2019 | Liu ........................ B60R 25/257 |
| 2019/0251539 | A1* | 8/2019 | Joyson ............. G06Q 20/40145 |
| 2019/0366981 | A1* | 12/2019 | Huang .................. B60R 25/252 |

* cited by examiner

*Primary Examiner* — Nabil H Syed
(74) *Attorney, Agent, or Firm* — Morgan, Lewis & Bockius LLP

(57) ABSTRACT

A vehicle may include a camera configured to acquire a face image of a user approaching from outside the vehicle and a gesture image of the user; a communication module configured for communicating with a mobile device; a door locking device configured to lock a door of the vehicle or unlock the door of the vehicle; and a processor configured to perform user authentication based on the user's surface image, and unlock the door when the user authentication is successful, and the processor may be configured to control the communication module to transmit the user's face image to a pre-registered mobile device when the user authentication fails a preset number of times, control the communication module to receive an emergency access signal from the pre-registered mobile device, and control the door locking device to unlock the door when a user's gesture image satisfies an unlock condition.

15 Claims, 10 Drawing Sheets

VEHICLE AND CONTROLLING METHOD THEREOF

CROSS-REFERENCE TO RELATED APPLICATION(S)

The present application claims priority to Korean Patent Application No. 10-2020-0113675, filed on Sep. 7, 2020, the entire contents of which is incorporated herein for all purposes by this reference.

BACKGROUND OF THE INVENTION

Field of the Invention

The present invention relates to a vehicle and a controlling method thereof, and more particularly, to a vehicle for controlling unlocking of a door.

Description of Related Art

Vehicles provided with various additional functions are being developed in consideration of user convenience and safety.

More specifically, one of the conventional vehicle access methods includes a physical method of directly inserting a key into a vehicle. Recently, technologies that allow access to a vehicle in a more convenient manner, such as a smart key and a digital key, which are recognized wirelessly at a certain distance outside the vehicle and control the unlocking of the door, have been developed.

Furthermore, as a convenience function of the vehicle for the user, not only when using keys such as smart keys and digital keys, but also when the user does not have the key, there is an attempt to enable user authentication using a camera to unlock the vehicle door.

The information included in this Background of the Invention section is only for enhancement of understanding of the general background of the invention and may not be taken as an acknowledgement or any form of suggestion that this information forms the prior art already known to a person skilled in the art.

BRIEF SUMMARY

According to various aspects of the present invention, the vehicle door may be unlocked through the user's face authentication, so that the vehicle can enter the vehicle even if the user does not have a key. Furthermore, when the user's face authentication fails in succession, the user can unlock the vehicle door using a mobile device, and thus, an attempt is made to provide a vehicle in which vehicle access is possible even if there is an error in the user's face authentication.

Various aspects of the present invention are directed to providing a vehicle which may include: a camera configured to acquire a face image of a user approaching from outside the vehicle and a gesture image of the user; a communication module configured for communicating with a mobile device; a door locking device configured to lock a door of the vehicle or unlock the door of the vehicle; and a processor configured to perform user authentication based on the user's face image, and unlock the door when the user authentication is successful. Also, the processor may be configured to control the communication module to transmit the user's face image to a pre-registered mobile device when the user authentication fails a preset number of times.

The processor may be configured to control the communication module to receive an emergency access signal from the pre-registered mobile device, and control the door locking device to unlock the door when a user's gesture image satisfies an unlock condition.

The processor may be configured to control the communication module to transmit driver identification information to the pre-registered mobile device, and control the door locking device to unlock the door when the use's gesture image corresponds to the driver identification information.

The processor may be configured to control the communication module to transmit an arbitrary authentication number to the pre-registered mobile device, and control the door locking device to unlock the door when the user's gesture image corresponds to the arbitrary authentication number.

The processor may be configured to control the communication module to transmit an arbitrary gesture image to the pre-registered mobile device, and control the door locking device to unlock the door when the user's gesture image corresponds to the arbitrary gesture image.

The processor may be configured to stop the user authentication when the communication module receives a stop signal from the pre-registered mobile device.

The processor may be configured to perform the user authentication again when the communication module receives a stop release signal from the pre-registered mobile device.

The vehicle may further include: an input configured to receive information on the mobile device and the processor may be configured to store the input information on the mobile device in a memory.

The processor may be configured to store the user's face image in a memory when the user authentication fails a predetermined number of times.

The camera may be provided on a B-pillar or A-pillar of the vehicle.

In accordance with an aspect of the present invention, a controlling method of a vehicle may include: acquiring a face image of a user approaching from outside the vehicle by a camera; performing user authentication based on the user's surface image; unlocking the door when the user authentication is successful; and controlling a communication module to transmit the user's face image to a pre-registered mobile device when the user authentication fails a preset number of times.

The method may further include acquiring a user's gesture image by the camera; controlling the communication module to receive an emergency access signal from the pre-registered mobile device, and controlling the door locking device to unlock the door when a user's gesture image satisfies an unlock condition.

Controlling the door locking device to unlock the door may include: controlling the communication module to transmit driver identification information to the pre-registered mobile device, and controlling the door locking device to unlock the door when the use's gesture image corresponds to the driver identification information.

Controlling the door locking device to unlock the door may include: controlling the communication module to transmit an arbitrary authentication number to the pre-registered mobile device, and controlling the door locking device to unlock the door when the user's gesture image corresponds to the arbitrary authentication number.

Controlling the door locking device to unlock the door may include: controlling the communication module to transmit an arbitrary gesture image to the pre-registered mobile device, and controlling the door locking device to unlock the door when the user's gesture image corresponds to the arbitrary gesture image.

The method may further include: stopping the user authentication when the communication module receives a stop signal from the pre-registered mobile device.

The method may further include: performing the user authentication again when the communication module receives a stop release signal from the pre-registered mobile device.

The method may further include: receiving information on the mobile device, and storing the input information on the mobile device in a memory.

The method may further include: storing the user's face image in a memory when the user authentication fails a predetermined number of times.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
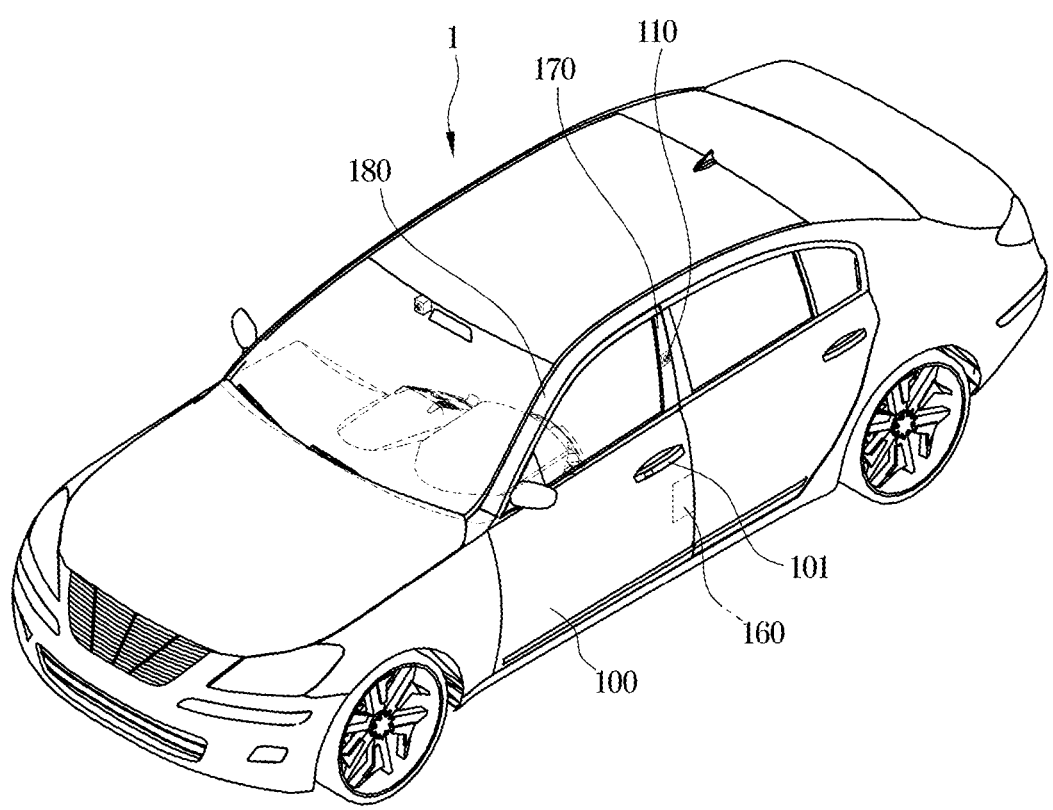
FIG. 1 is a diagram illustrating an exterior of a vehicle according to various exemplary embodiments of the present invention.

It may be understood that the appended drawings are not necessarily to scale, presenting a somewhat simplified representation of various features illustrative of the basic principles of the invention. The specific design features of the present invention as included herein, including, for example, specific dimensions, orientations, locations, and shapes will be determined in part by the particularly intended application and use environment.

In the figures, reference numbers refer to the same or equivalent portions of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments of the present invention, it will be understood that the present description is not intended to limit the invention(s) to those exemplary embodiments. On the other hand, the invention(s) is/are intended to cover not only the exemplary embodiments of the present invention, but also various alternatives, modifications, equivalents and other embodiments, which may be included within the spirit and scope of the invention as defined by the appended claims.

Like reference numerals refer to like elements throughout. The present invention does not describe all elements of the embodiments, and overlaps between the general contents or the exemplary embodiments in the Field of the Invention to which various exemplary embodiments of the present invention belongs. The present specification does not describe all elements of the exemplary embodiments of the present invention and detailed descriptions on what are well known in the art or redundant descriptions on substantially the same configurations may be omitted. The term 'part, module, member, block' used in the specification may be implemented in software or hardware, and a plurality of 'part, module, member, block' may be embodied as one component. It is also possible that one 'part, module, member, block' includes a plurality of components.

Throughout the specification, when an element is referred to as being "connected to" another element, it may be directly or indirectly connected to the other element and the "indirectly connected to" includes being connected to the other element via a wireless communication network.

Furthermore, when a part is the to "include" a certain component, this means that it may further include other components, except to exclude other components unless otherwise stated.

Throughout the specification, when a member is located "on" another member, this includes not only when one member is in contact with another member but also when another member exists between the two members.

The terms first, second, etc. are used to distinguish one component from another component, and the component is not limited by the terms described above.

Singular expressions include plural expressions unless the context clearly indicates an exception.

In each step, the identification code is used for convenience of description, and the identification code does not describe the order of each step. Each of the steps may be performed out of the stated order unless the context clearly dictates the specific order.

Hereinafter, with reference to the accompanying drawings will be described the working principle and embodiments of the present invention.

Figure 2:
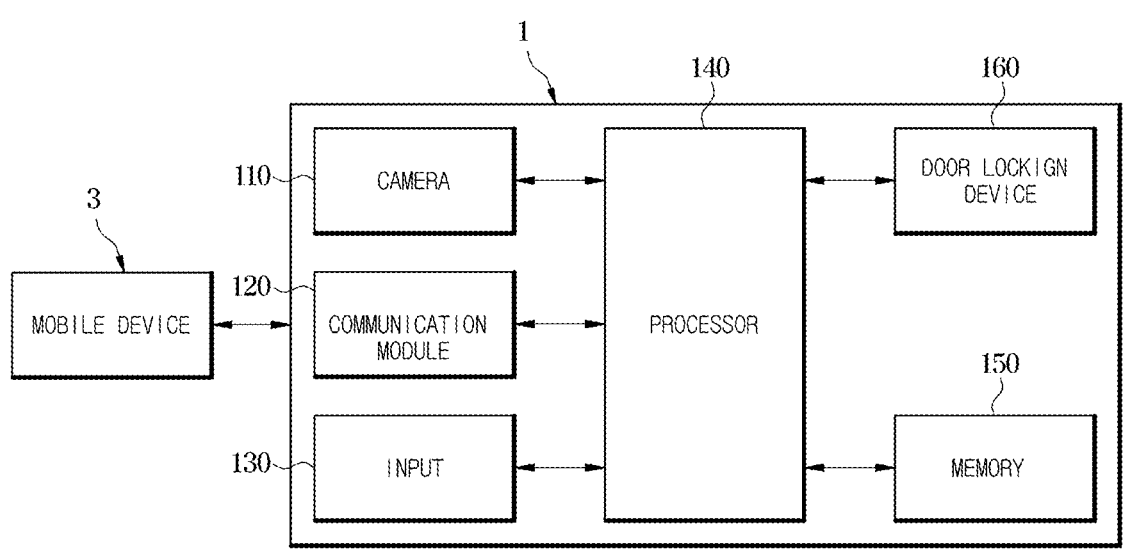
FIG. 2 is a control block diagram of a vehicle according to various exemplary embodiments of the present invention.

FIG. 1 diagram illustrating an exterior of a vehicle according to various exemplary embodiments of the present invention. FIG. 2 is a control block diagram of a vehicle according to various exemplary embodiments of the present invention.

Referring to FIG. 1 and FIG. 2, the vehicle 1 according to the disclosed embodiment includes a door 100, a door handle 101, a camera 110, a communication module 120, an input 130, a processor 150, a memory 150, a door locking device 160, a B-pillar 170 and a A-pillar 180.

The door 100 is provided to be rotatable on the left and right sides of the vehicle 1 so that the user can board the interior of the vehicle 1 when opened, and shields the interior of the vehicle 1 from the outside thereof when closed.

The door handle 101 is provided on the door 100, and a user can open the door 100 by manipulating the door handle 101.

The camera 110 may acquire a face image of the external user 2 of the vehicle 1 and a gesture image of the user 2, and may transmit the acquired image information to the processor 140.

The communication module 120 may transmit various signals to the mobile device 3 through a wireless communication network or may receive various signals from the mobile device 3. Here, the wireless communication network refers to a communication network configured for transmitting and receiving signals wirelessly. For example, the wireless communication network includes, but is not limited to, not only a 3G communication network, a 4G communication network, and a 5G communication network, but also a Bluetooth communication network. The communication module 120 may transmit a signal received from the mobile device 3 to the processor 140.

The communication module 120 may also transmit various signals to the mobile device 3 through a wireless communication network used by audio video navigation (AVN).

When the communication module 120 performs near field communication with the mobile device 3, various signals may be transmitted to the mobile device 3 through at least one of near field communication (NFC), Bluetooth, Bluetooth low power (BLE) and Ultra Wide Band (UWB).

The input 130 may receive information on the mobile device 3 from a user. The information on the mobile device 3 may be a phone number or a unique number of the mobile device 3, but is not limited thereto. Furthermore, the input 130 may be provided in an audio video navigation (AVN) device, but is not limited thereto.

In the instant case, the mobile device corresponding to the input information may be referred to as a mobile device 3 registered in advance. The input 130 may transmit information on the mobile device 3 registered in advance to the processor 140.

The door locking device 160 may lock the door 100 of the vehicle 1 or unlock the door 100.

The processor 140 may perform user authentication based on the face image of the user 2, and may unlock the door 100 if the user authentication is successful.

In the user authentication, the processor 140 determines whether the user 2 attempting to unlock the door is a registered driver based on the face image of the user 2. If user authentication is successful, the processor 140 may control the door locking device 160 to unlock the door 100.

The processor 140 may control the communication module 120 to transmit the face image of the user 2 captured by the camera 110 to the pre-registered mobile device 3 when user authentication fails a predetermined number of times.

The preset number is the number of times that user authentication may be repeatedly performed.

The user 2 may check the face image of the user 2 displayed on the display of the mobile device 3 registered in advance, and may input a command to perform the emergency access mode to the mobile device 3 registered in advance. In the instant case, the emergency access mode may be a mode in which the door 100 is unlocked by another method when the registered driver himself or herself fails to authenticate the user for a preset number of times and access to the vehicle 1 is impossible.

The mobile device 3 registered in advance may transmit an emergency access signal to the communication module 120 upon receiving a command to perform the emergency access mode.

The mobile device 3 registered in advance may transmit an emergency access signal to the communication module 120 upon receiving a command to perform the emergency access mode.

The processor 140 may perform an emergency access mode when the communication module 120 receives an emergency access signal from the mobile device 3 registered in advance.

In the emergency access mode, the processor 140 may control the communication module 120 to transmit driver identification information to the mobile device 3 registered in advance.

The driver identification information may be information which is configured as a basis for determining whether the person who has repeatedly performed user authentication is a registered driver who has the mobile device 3 registered in advance.

The user 2 may recognize driver identification information through the mobile device 3 registered in advance. In the instant case, the user 2 may take a gesture corresponding to driver identification information.

The processor 140 may control the camera 110 to acquire a gesture image of the user 2.

The unlock condition may be a condition that becomes a reference when the processor 140 determines whether to unlock the door 100 based on the gesture image of the user 2. If the gesture image of the user 2 corresponds to driver identification information transmitted to the mobile device 3 registered in advance, the unlock condition may be satisfied.

The processor 140 may control the door locking device to unlock the door 100 when the acquired gesture image of the user 2 satisfies the unlock condition.

The memory 150 may store pre-registered information on the mobile device 3 and a face image of the user 2.

The memory 150 may store a program that performs the above-described operation and an operation described later, and the processor 140 may execute the stored program. When the memory 150 and the processor 140 are plural, they may be integrated into one chip, or may be provided in physically separate locations. The memory 150 may include a volatile memory such as a static random access memory (S-RAM) and a dynamic random access memory (Dlap) for temporarily storing data. Furthermore, the memory 150 may include non-volatile memory such as a ROM (Read Only Memory), an Erasable Programmable Read Only Memory (EPROM), and an EEPROM (Electrically Erasable Programmable Read Only Memory: EEPROM) for storing control programs and control data for a long time. The processor 140 may include various logic circuits and operation circuits, may process data according to a program provided from the memory 150, and may generate a control signal according to the processing result.

The mobile device 3 may transmit various signals to the communication module 120 through a wireless communication network or may receive various signals from the communication module 120. At the instant time, the mobile device 3 may display information corresponding to the received signal on the display of the mobile device 3, and the mobile device 3 may be a pre-registered mobile device.

Figure 3:
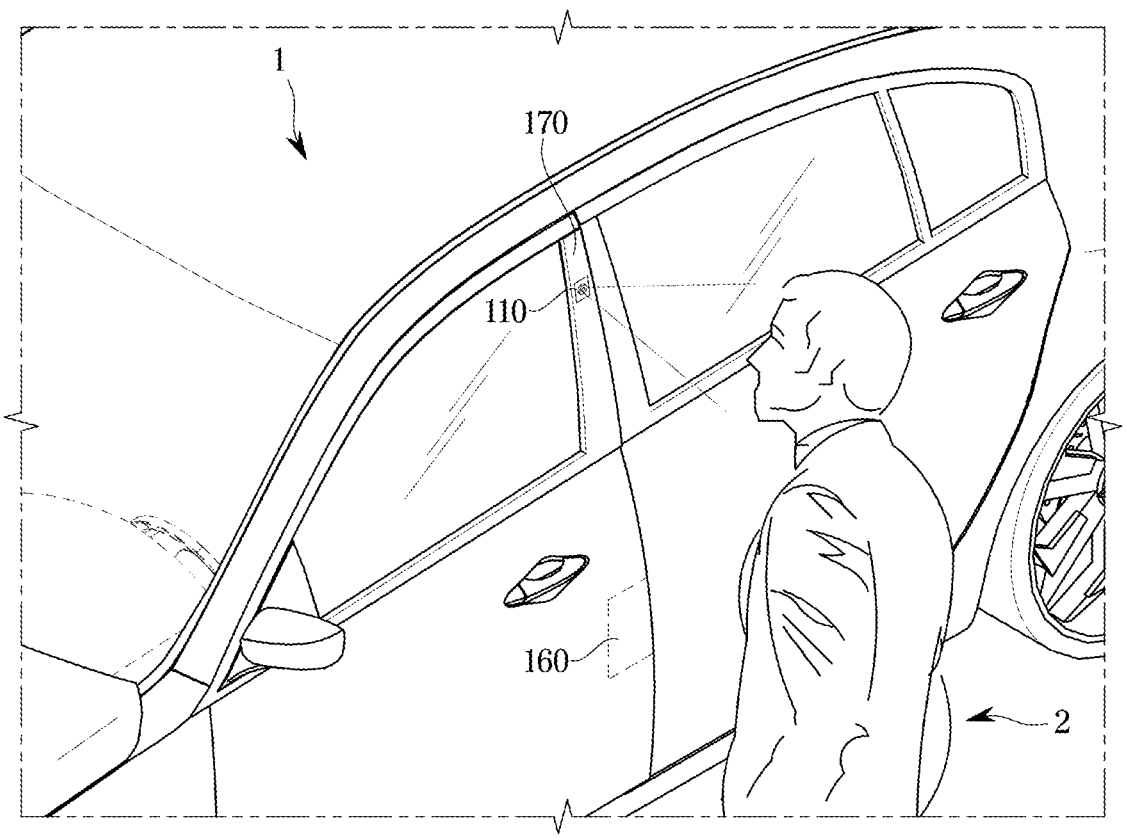
FIG. 3 is a diagram illustrating performing user authentication in various exemplary embodiments of the present invention.

FIG. 3 is a diagram illustrating performing user authentication in an exemplary embodiment of the present invention.

Referring to FIG. 3, the camera 110 may acquire a face image of a user 2 approaching from outside the vehicle.

If the similarity between the face image of the user 2 obtained from the camera 110 and the reference image is equal to or greater than a preset value, the processor 140 determines that user authentication has been successful, and controls the door locking device 160 to unlock the door 100.

In the instant case, the reference image may be a face image of a registered driver who is allowed to unlock the door 100. The reference image may be previously stored in the memory 150, and a plurality of reference images may exist.

The processor 140 may determine that user authentication has failed if the similarity between the face image of the user 2 obtained from the camera 110 and the reference image is less than a preset value. When it is determined that user authentication has failed, the camera 110 may acquire the face image of the user 2 again, the processor 140 may perform user authentication again based on the acquired face image of the user 2 again.

Furthermore, the processor 140 may count the number of times the user authentication has failed when user authentication is repeatedly performed.

Figure 4A:
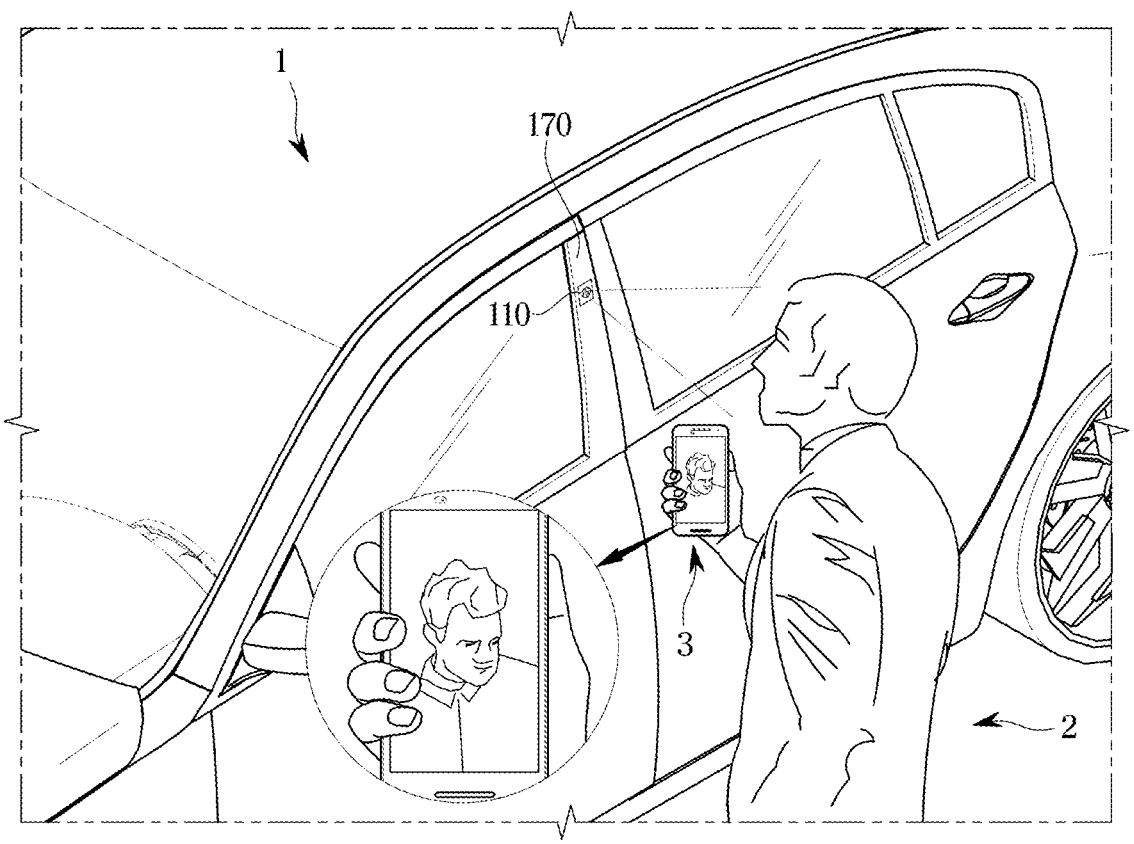
FIG. 4A is a diagram for explaining an example of receiving an emergency access signal from a registered mobile device in various exemplary embodiments of the present invention.

FIG. 4A is a diagram for explaining an example of receiving an emergency access signal from a registered mobile device in an exemplary embodiment of the present invention.

In the user authentication process, it may not always be correctly determined whether the user 2's surface is the registered driver's surface. User authentication may fail even when the registered driver is the user 2 according to changes in the driver's appearance and various lighting environments. That is, if the registered driver himself or herself fails to authenticate the user, a situation in which the registered driver cannot enter the vehicle may occur.

Referring to FIG. 4A, when a registered driver himself or herself fails to authenticate a user and cannot enter the vehicle 1, the door 100 may be unlocked in another way.

The processor 140 may control the communication module 120 to transmit the face image of the user 2 captured by the camera 110 to the pre-registered mobile device 3 when user authentication fails a predetermined number of times.

In the instant case, the pre-registered mobile device 3 may display the received face image of the user 2 on the display of the pre-registered mobile device 3.

The user 2 may check the face image of the user 2 displayed on the display of the mobile device 3 registered in advance. The user 2 confirms that the face image of the user 2 displayed on the display of the mobile device 3 is his or her own face image, and can input a command to execute the emergency access mode to the mobile device 3 registered in advance.

The mobile device 3 registered in advance may transmit an emergency access signal to the communication module 120 when a command to perform the emergency access mode is received from the user 2.

The processor 140 may perform an emergency access mode when the communication module 120 receives an emergency access signal from the mobile device 3 registered in advance.

Figure 4B:
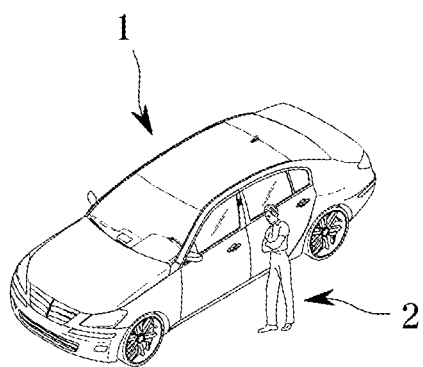
FIG. 4B is a diagram for explaining an example of receiving a stop signal from a registered mobile device in various exemplary embodiments of the present invention.
Figure 4B:
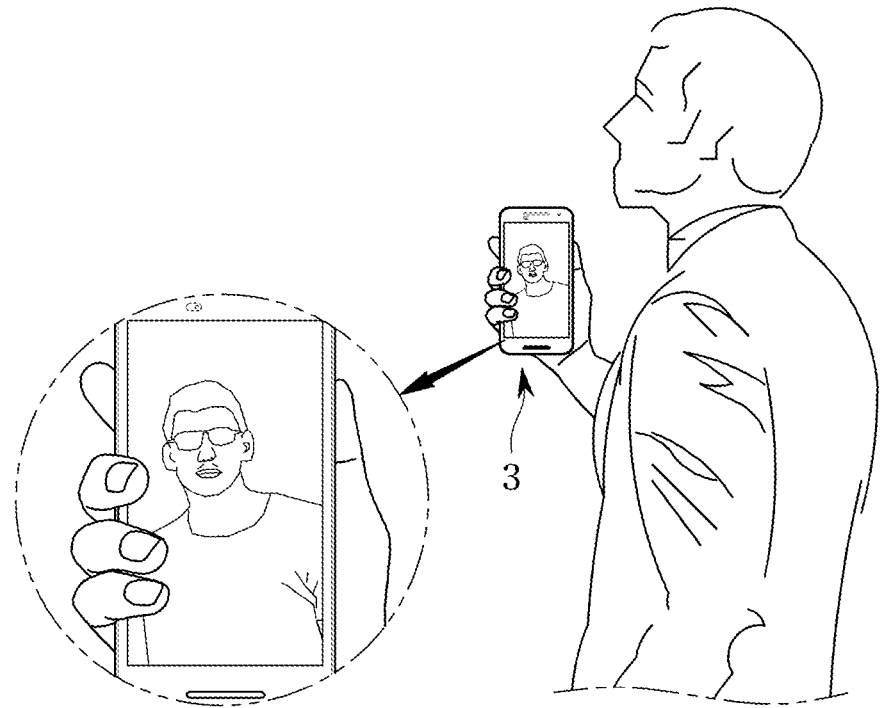

FIG. 4B is a diagram for explaining an example of receiving a stop signal from the registered mobile device 3 in an exemplary embodiment of the present invention.

If user authentication fails continuously, it may be a situation in which a person with the intention of stealing the vehicle 1 repeatedly authenticates the user. At the instant time, the registered driver may need to prevent the vehicle 1 from being stolen.

Referring to FIG. 4B, when the user 2 other than the registered driver fails user authentication, the registered driver can take action with the mobile device 3 registered in advance.

The processor 140 may control the communication module 120 to transmit the face image of the user 2 captured by the camera 110 to the pre-registered mobile device 3 when user authentication fails a predetermined number of times. In the instant case, the pre-registered mobile device 3 may display the received face image of the user 2 on the display of the pre-registered mobile device 3.

The processor 140 may store the face image of the user 2 in the memory 150 when user authentication fails a predetermined number of times.

The registered driver may check the face image of the user 2 displayed on the display of the mobile device 3 registered in advance, and may input a command to stop performing user authentication on the mobile device registered in advance.

The mobile device 3 registered in advance may transmit a stop signal to the communication module 120 upon receiving a command to stop performing user authentication. The processor 140 may stop performing user authentication when the communication module 120 receives a stop signal from the mobile device 3 registered in advance.

Figure 5A:
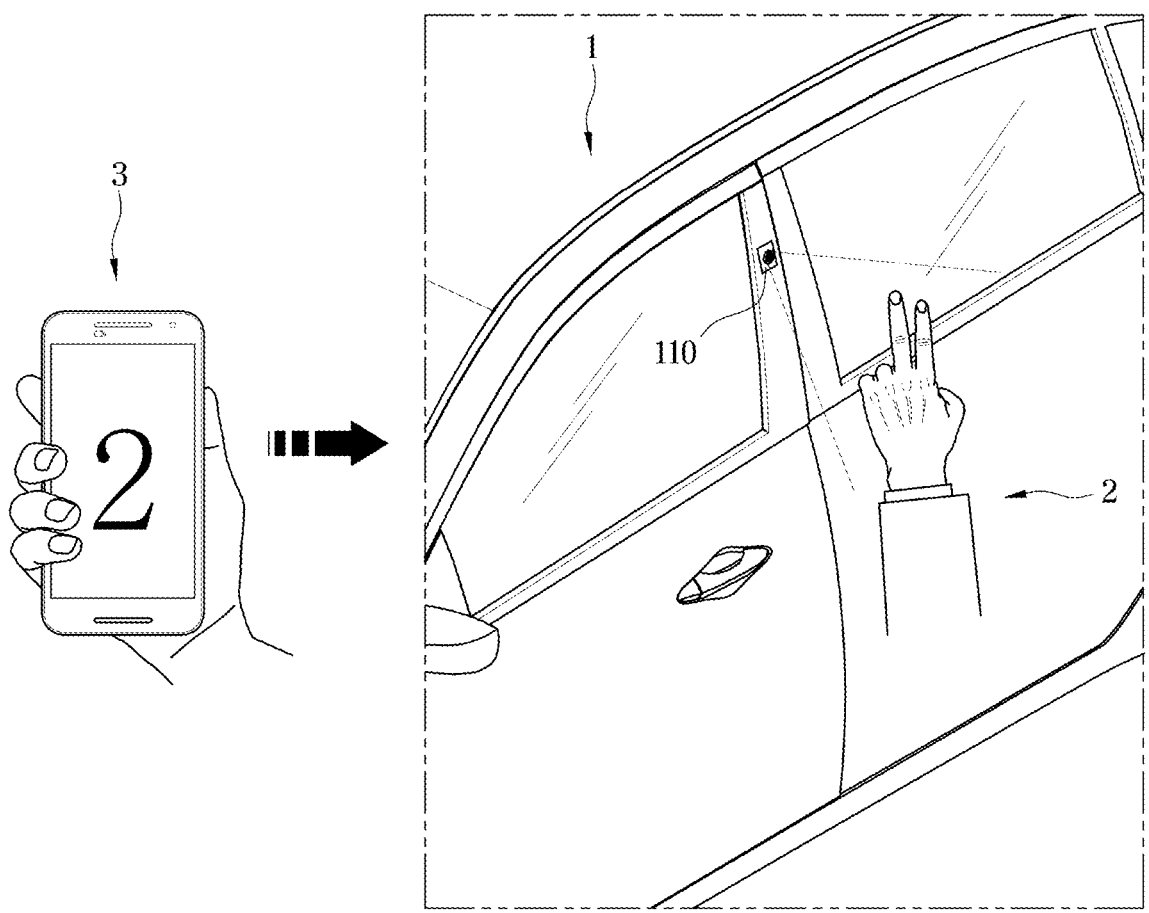
FIG. 5A is a diagram illustrating a gesture corresponding to a random authentication number in various exemplary embodiments of the present invention.
Figure 5B:
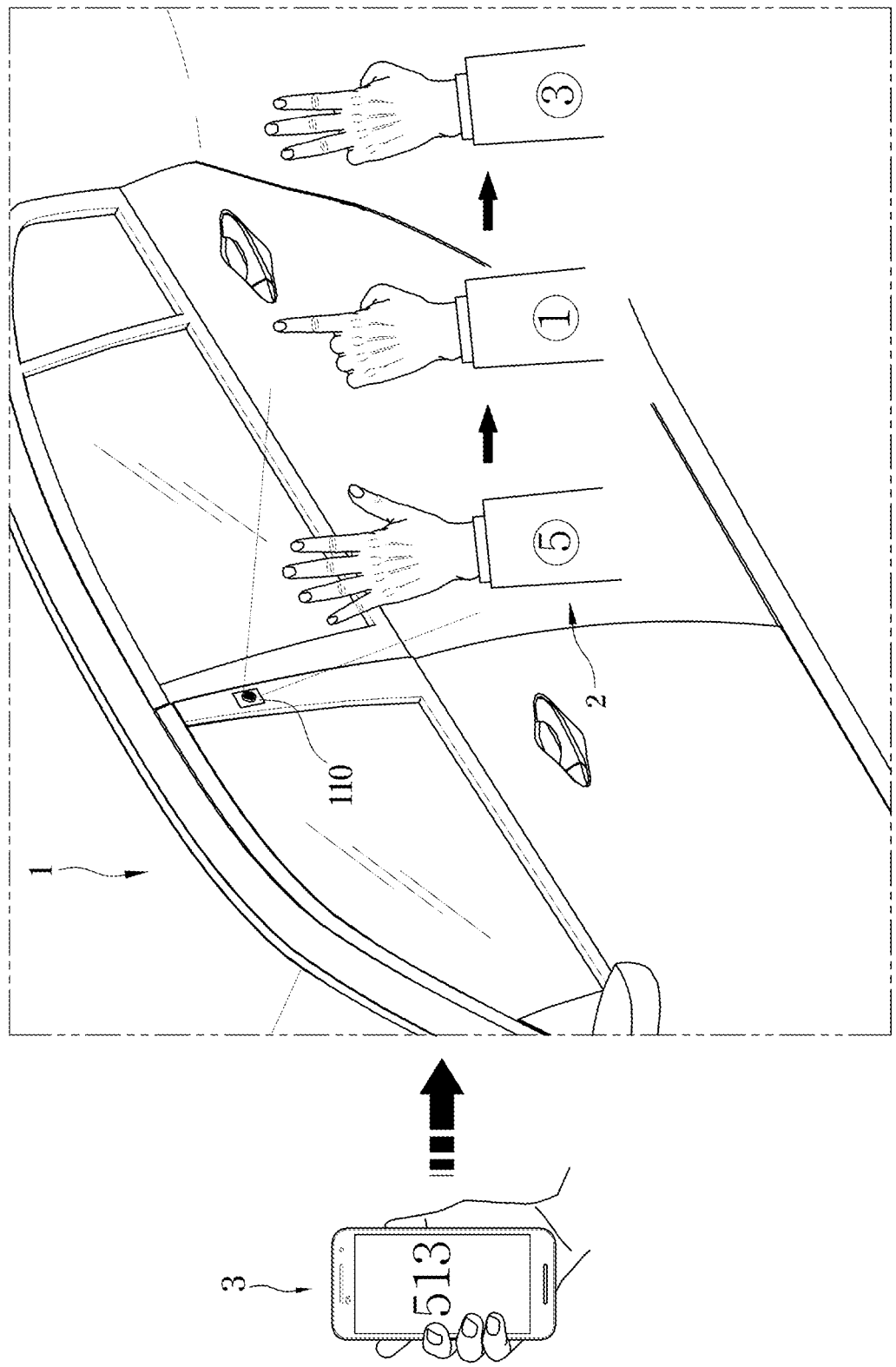
FIG. 5B is a diagram illustrating gestures respectively corresponding to a plurality of random numbers in various exemplary embodiments of the present invention.
Figure 6:
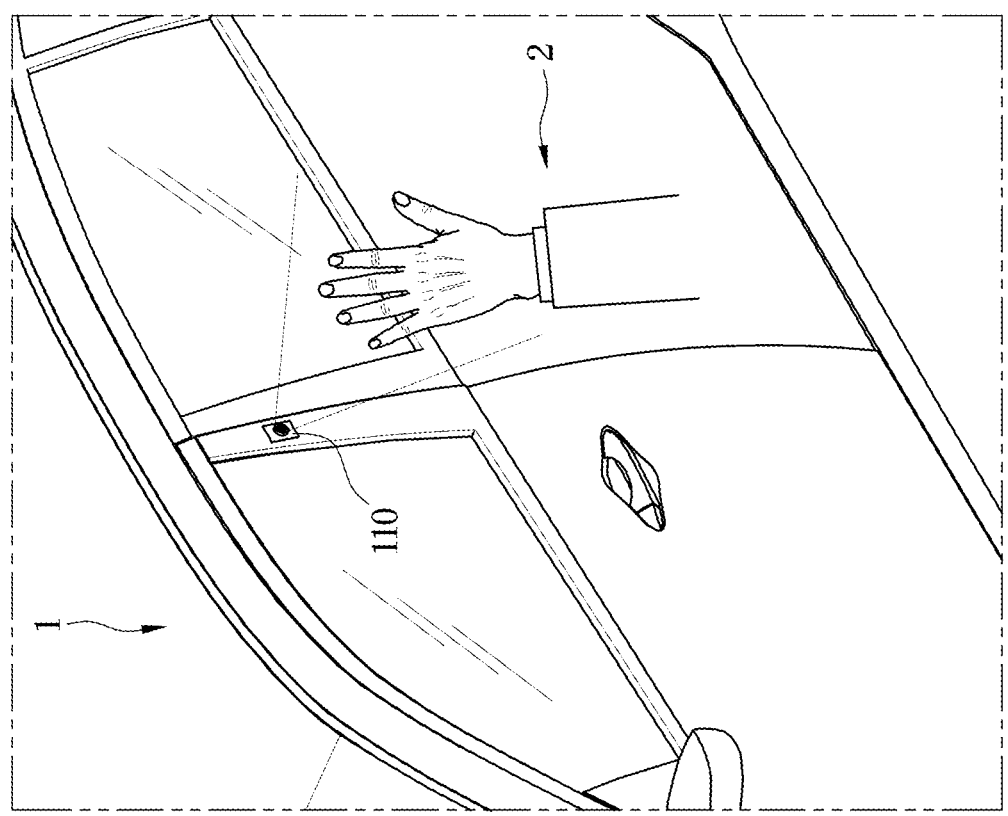
FIG. 6 is a diagram illustrating a user's gesture corresponding to an arbitrary gesture image in various exemplary embodiments of the present invention.
Figure 6:
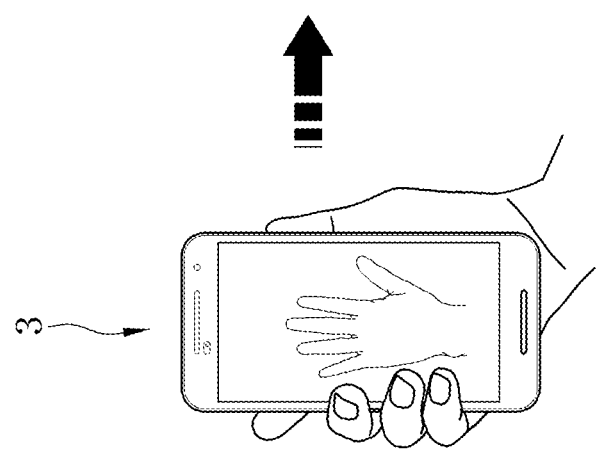

FIG. 5A, 5B, and FIG. 6 are diagrams illustrating performing an emergency access mode according to each example.

The processor 140 may perform an emergency access mode when the communication module 120 receives an emergency access signal from the mobile device 3 registered in advance. In the instant case, the processor 140 may control the communication module 120 to transmit driver identification information to the mobile device 3 registered in advance.

The mobile device 3 registered in advance may display driver identification information on the display upon receiving driver identification information.

The user 2 may recognize driver identification information through the mobile device 3 registered in advance. In the instant case, the user 2 may take a gesture corresponding to driver identification information.

The processor 140 may control the camera 110 to acquire a gesture image of the user 2 in the emergency access mode.

When the acquired gesture image of the user 2 corresponds to driver identification information, the processor 140 may control the door locking device 160 to unlock the door 100.

FIG. 5A is a diagram illustrating a gesture corresponding to random authentication number in an exemplary embodiment of the present invention.

Referring to FIG. 5A, the driver identification information may be a random authentication number. The processor 140 may determine a random authentication number. In the instant case, the random authentication number may be a number arbitrarily determined from 1, 2, 3, 4, and 5.

For example, the processor 140 may determine the number 2 as a random authentication number.

The mobile device 3 registered in advance may receive driver identification information corresponding to 2 and display 2 on the display of the mobile device 3.

At the present time, the user 2 may check the display of the mobile device 3 and take a gesture corresponding to 2.

For example, the gesture corresponding to 2 may be a gesture in which the user 2 indicates 2 with a finger.

The gesture image of the user 2 acquired by the camera 110 is a gesture image representing 2 with a finger, and since this corresponds to an authentication number corresponding to 2, the processor 140 controls the door locking device 160 to unlock the door 100.

FIG. 5B is a diagram illustrating gestures respectively corresponding to a plurality of random numbers in an exemplary embodiment of the present invention.

Referring to FIG. 5B, the authentication number may be a plurality of random numbers. The processor 140 may determine random plurality of numbers. In the instant case, the plurality of random numbers may be a plurality of randomly determined numbers from 1, 2, 3, 4, and 5.

For example, the processor 140 may determine the numbers 5, 1, and 3 with a plurality of random numbers.

The mobile device 3 registered in advance may receive driver identification information corresponding to 5, 1, and 3, and display 5, 1, and 3 on the display of the mobile device 3.

At the present time, the user 2 may check the display of the mobile device 3 and take gestures corresponding to 5, 1 and 3.

The plurality of gesture images of the user 2 acquired by the camera 110 are gesture images representing 5, 1 and 3 with a finger, and this corresponds to driver identification information corresponding to 5, 1 and 3, so that the processor 140 Controls the door locking device 160 to unlock the door 100.

As described above, unlocking the door 100 based on the gesture image of the user 2 and a random authentication number may be a method using a gesture image of the user 2 representing each number, but is not limited thereto. Any method may be possible as long as the camera 110 can acquire a gesture corresponding to information displayed on the registered mobile device 3.

FIG. 6 is a diagram showing a gesture of a user 2 corresponding to an arbitrary gesture image in an exemplary embodiment of the present invention.

Referring to FIG. 6, driver identification information may be an arbitrary gesture image.

Processor 140 may determine an arbitrary gesture image. In the instant case, the arbitrary gesture may be a hand gesture arbitrarily determined among various hand gestures.

For example, the processor 140 may determine a gesture to open a palm with an arbitrary gesture image.

The mobile device 3 registered in advance may receive driver identification information corresponding to the palm opening gesture, and display the palm opening gesture on the display of the mobile device 3.

At the present time, the user 2 can check the display of the mobile device 3 and make a gesture to open the palm.

The gesture image of the user 2 acquired by the camera 110 is a gesture image with a palm open, which corresponds to an arbitrary gesture image with a palm open, so that the processor 140 controls the door locking device 160 to control the door 100 to be unlocked.

As described above, the unlocking of the door 100 based on the gesture image of the user 2 and the arbitrary gesture image may be a method using one arbitrarily determined gesture image, but is not limited thereto. Any method may be possible as long as the camera 110 can obtain a gesture of the user 2 corresponding to the gesture displayed on the pre-registered mobile device 3.

Figure 7:
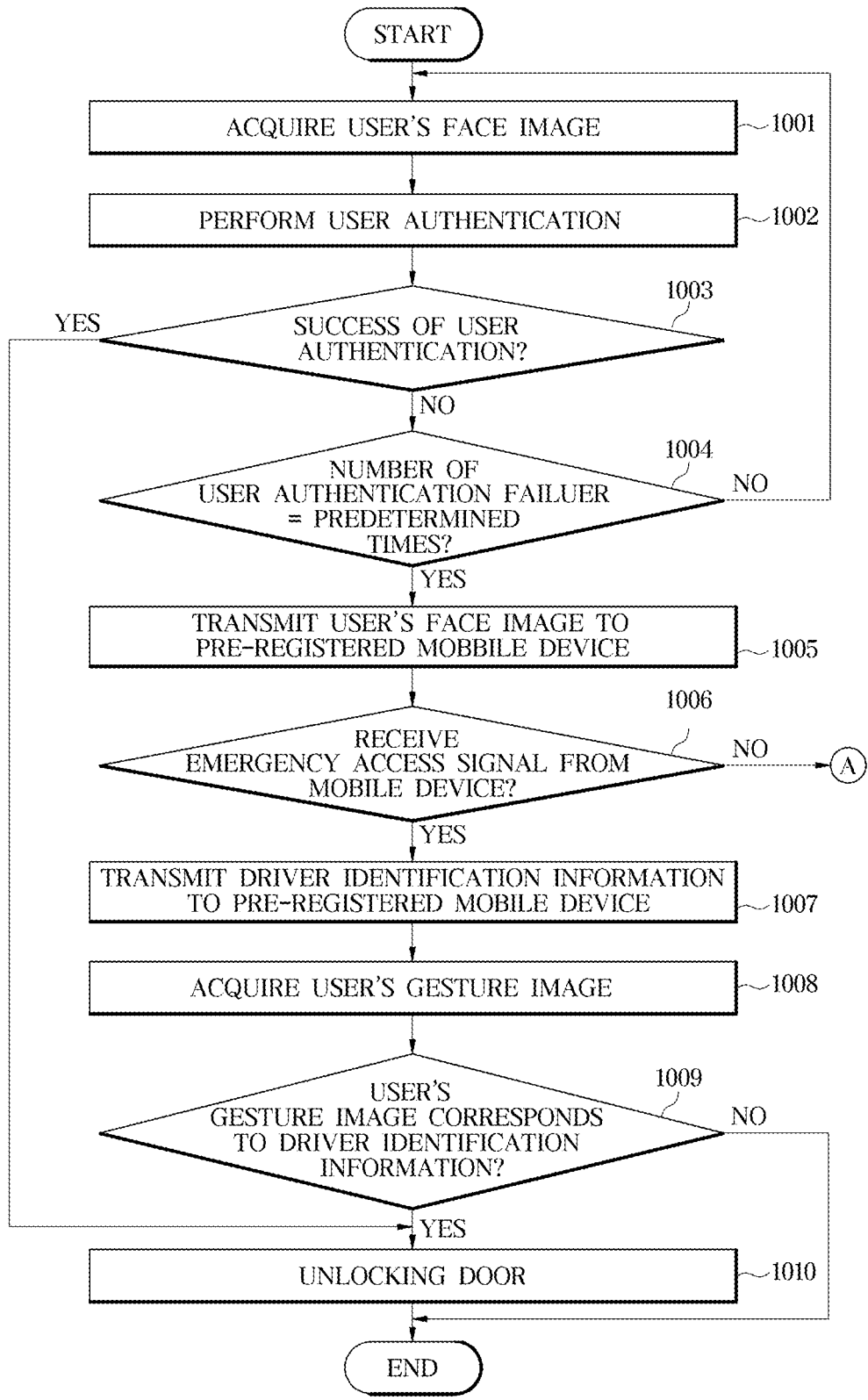
FIG. 7 is a diagram showing a flow chart of a procedure for unlocking a door according to various exemplary embodiments of the present invention.

FIG. 7 is a diagram showing a flow chart of a procedure for unlocking a door according to an exemplary embodiment of the present invention. This is only an exemplary embodiment for achieving the object of the present invention, and of course, some configurations may be added or deleted as necessary.

Referring to FIG. 7, the camera 110 may acquire a face image of the user 2 (1001). In the instant case, the camera 110 may wake up when the user 2 touches the door handle 101 or may acquire a face image of the user 2. However, the time point at which the camera 110 wakes up or acquires a face image of the user 2 is not limited only when the user 2 touches the door handle 101. The camera 110 may transmit the acquired face image of the user 2 to the processor 140.

The processor 140 may perform user authentication based on the acquired face image of the user 2 (1002).

The processor 140 may determine whether user authentication is successful based on the acquired face image and the reference image of the user 2 (1003). If it is determined that the user authentication is successful (YES in 1003), the processor 140 may unlock the door 100 by controlling the door locking device 160. If it is determined that user authentication has failed ("No" in 1003), the processor 140 counts the accumulated number of user authentication failures.

The processor 140 may determine whether the number of times the user authentication has failed is equal to a preset number of times (1004).

If the number of user authentication failures is not the same as the preset number ('No' in 1004), the camera 110 acquires the face image of the user 2 again, and the processor 140 performs user authentication again based on the acquired face image of the user 2 again.

When the number of user authentication failures is the same as the preset number ('Yes' in 1004), the processor 140 controls the communication module 120 to transmit the face image of the user 2 to the mobile device 3 registered in advance. (1005). In the instant case, the pre-registered mobile device 3 may display the received face image of the user 2 on the display of the pre-registered mobile device 3.

The user 2 may select an appropriate command based on the displayed face image of the user 2 and input it to the mobile device 3 registered in advance.

That is, if the displayed face image is the image of the registered driver, the user 2 can input a command to perform the emergency access mode, and the registered driver may input a command to stop performing user authentication if the displayed face image is an image of a person other than the registered driver.

The mobile device 3 registered in advance can transmit an emergency access signal to the communication module 120 when receiving a command to perform the emergency access mode, and when receiving a command to stop performing user authentication, the communication module 120 transmits a stop signal to the communication module 120.

When the communication module 120 receives an emergency access signal from the pre-registered mobile device 3 ('Yes' in 1006), the processor 140 may transmit driver identification information to the pre-registered mobile device 3 (1007). In the instant case, the driver identification information may be a random authentication number or an arbitrary gesture image.

The mobile device 3 registered in advance may display driver identification information on the display upon receiving driver identification information. In the instant case, the user 2 may take a gesture corresponding to the driver identification information, and the processor 140 may control the camera 110 to acquire a gesture image of the user 2 (1008).

The processor 140 may determine whether the acquired gesture image of the user 2 corresponds to driver identification information (1009). If the gesture image of the user 2 does not correspond to the driver identification information ("No" in 1009), the door 100 may not be unlocked.

When the gesture image of the user 2 corresponds to the driver identification information ('Yes' in 1009), the processor 140 may control the door locking device 160 to unlock the door 100 (1010).

Figure 8:
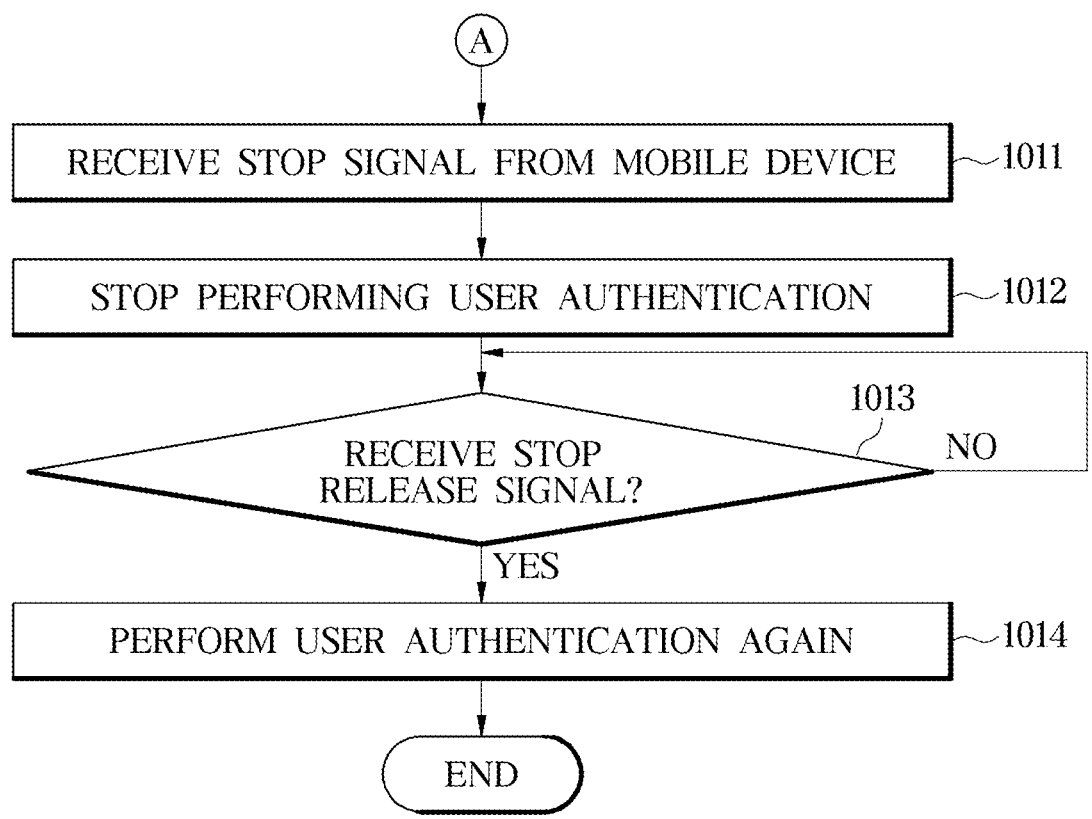
FIG. 8 is a diagram illustrating a flow chart of a procedure for stopping and performing user authentication again according to various exemplary embodiments of the present invention.

FIG. 8 is a diagram illustrating a flow chart of a procedure for stopping and performing user authentication again according to an exemplary embodiment of the present invention.

Referring to FIG. 8, the communication module 120 may receive a stop signal without receiving an emergency access signal from a pre-registered mobile device ("No" in 1006) (1011).

When the communication module 120 receives a stop signal from the mobile device 3 registered in advance, the processor 140 stops performing user authentication (1012). In the instant case, the processor 140 may store the acquired face image of the user 2 in the memory 150.

When the user authentication is stopped, unlocking the door 100 through face authentication of the user 2 may be impossible.

The registered driver may later attempt to unlock the door 100 through his or her face authentication. The registered driver may input a command to perform user authentication again on the previously registered mobile device 3. In the instant case, the mobile device 3 registered in advance may transmit a stop release signal to the communication module 120.

When the communication module 120 receives the stop release signal (YES in 1013), the processor 140 may perform user authentication again (1014).

The disclosed exemplary embodiments may be implemented in a form of a recording medium storing instructions executable by a computer. The instruction may be stored in a form of a program code, and when executed by a processor, a program module may be generated to perform the operation of the included exemplary embodiments. The recording medium may be implemented as a computer-readable recording medium.

The non-transitory computer-readable recording medium includes all types of recording media storing data readable by a computer system. Examples of the computer-readable recording medium include a Read Only Memory (ROM), a Random Access Memory (RAM), a magnetic tape, a magnetic disk, a flash memory, an optical data storage device, or the like.

Although a few exemplary embodiments of the present invention have been shown and described, it would be appreciated by those skilled in the art that changes may be made in these exemplary embodiments without departing from the principles and spirit of the present invention, the scope of which is defined in the claims and their equivalents.

According to various aspects of the present invention, it is possible to provide a vehicle configured for unlocking a door by another method when user authentication fails continuously even though a registered driver is unable to enter the vehicle.

According to various aspects of the present invention, it is possible to provide a vehicle and a control method thereof configured for preventing a risk of theft of a vehicle by storing a face image of a person who attempted user authentication and transmitting it to a registered mobile device.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of specific exemplary embodiments of the present invention have been presented for purposes of illustration and description. They are not intended to be exhaustive or to limit the present invention to the precise forms disclosed, and obviously many modifications and variations are possible in light of the above teachings. The exemplary embodiments were chosen and described to explain certain principles of the present invention and their practical application, to enable others skilled in the art to make and utilize various exemplary embodiments of the present invention, as well as various alternatives and modifications thereof. It is intended that the scope of the present invention be defined by the Claims appended hereto and their equivalents.

What is claimed is:

1. A vehicle comprising:
   a camera configured to acquire a face image of a user approaching from outside the vehicle;
   a door locking device configured to lock a door of the vehicle or unlock the door of the vehicle;
   a processor configured to perform user authentication according to the face image of the user, and to unlock the door upon determining that the user authentication is successful,
   wherein the processor is configured to control the communication module to transmit the face image of the user to a pre-registered mobile device upon determining that the user authentication fails a predetermined number of times,
   wherein the processor is configured to control the communication module to receive an emergency access signal from the pre-registered mobile device in response to the transmission of the face image of the user to the pre-registered mobile device,
   wherein in response to the emergency access signal the processor is configured to control the communication module to transmit an arbitrary authentication number to the pre-registered mobile device and to control the camera to acquire a gesture image of the user;
   wherein the processor is configured to control the door locking device to unlock the door upon determining that the gesture image of the user corresponds to the arbitrary authentication number, wherein the gesture image is an image representing one or more numbers with one or more fingers.

2. The vehicle according to claim 1, wherein the processor is configured to control the communication module to transmit driver identification information to the pre-registered mobile device, and control the door locking device to unlock the door upon determining that the gesture image of the user corresponds to the driver identification information.

3. The vehicle according to claim 1, wherein the processor is configured to control the communication module to transmit an arbitrary gesture image to the pre-registered mobile device, and to control the door locking device to unlock the door upon determining that the gesture image of the user corresponds to the arbitrary gesture image.

4. The vehicle according to claim 1, wherein the processor is configured to stop the user authentication upon determining that the communication module receives a stop signal from the pre-registered mobile device.

5. The vehicle according to claim 4, wherein the processor is configured to perform the user authentication again upon determining that the communication module receives a stop release signal from the pre-registered mobile device.

6. The vehicle according to claim 1 further including:
an input configured to receive information on the mobile device,
wherein the processor is configured to receive the information on the mobile device from the input and to store the information on the mobile device in a memory.

7. The vehicle according to claim 1, wherein the processor is configured to store the face image of the user in a memory upon determining that the user authentication fails a predetermined number of times.

8. The vehicle according to claim 1, wherein the camera is provided on a B-pillar or A-pillar of the vehicle.

9. A controlling method of a vehicle, the controlling method comprising:
acquiring a face image of a user approaching from outside the vehicle by a camera;
performing, by a processor connected to the camera, user authentication according to the face image of the user;
unlocking, by the processor, a door upon determining that the user authentication is successful;
controlling, by the processor, a communication module connected to the processor to transmit the face image of the user to a pre-registered mobile device upon determining that the user authentication fails a predetermined number of times;
controlling, by the processor, the communication module to receive an emergency access signal from the pre-registered mobile device in response to the transmission of the face image of the user to the pre-registered mobile device,
controlling the communication module to transmit an arbitrary authentication number to the pre-registered mobile device in response to the emergency access signal from the pre-registered mobile device and controlling the camera to acquire a gesture image of the user, and
controlling the door locking device to unlock the door upon determining that the gesture image of the user corresponds to the arbitrary authentication number, and wherein the gesture image is an image representing one or more numbers with one or more fingers.

10. The method according to claim 9, wherein the controlling the door locking device to unlock the door includes:
controlling the communication module to transmit driver identification information to the pre-registered mobile device, and
controlling the door locking device to unlock the door upon determining that the gesture image of the user corresponds to the driver identification information.

11. The method according to claim 9, wherein the controlling the door locking device to unlock the door includes:
controlling the communication module to transmit an arbitrary gesture image to the pre-registered mobile device, and
controlling the door locking device to unlock the door upon determining that the gesture image of the user corresponds to the arbitrary gesture image.

12. The method according to claim 9, further including:
stopping, by the processor, the user authentication upon determining that the communication module receives a stop signal from the pre-registered mobile device.

13. The method according to claim 12, further including:
performing, by the processor, the user authentication again upon determining that the communication module receives a stop release signal from the pre-registered mobile device.

14. The method according to claim 9, further including:
receiving, by the processor, information on the mobile device, and
storing, by the processor, the information on the mobile device in a memory.

15. The method according to claim 9, further including:
storing, by the processor, the face image of the user in a memory upon determining that the user authentication fails a predetermined number of times.

* * * * *